(12) United States Patent  
Aaron

(10) Patent No.: US 8,611,907 B2
(45) Date of Patent: Dec. 17, 2013

(54) METHODS, SYSTEMS, AND COMPUTER-READABLE MEDIA FOR ADAPTING A QUALITY OF SERVICE MECHANISM BASED ON FEEDBACK

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1549 days.

(21) Appl. No.: 11/863,980

(22) Filed: Sep. 28, 2007

(65) Prior Publication Data

US 2009/0088170 A1 Apr. 2, 2009

(51) Int. Cl.
*H04W 40/00* (2009.01)

(52) U.S. Cl.
USPC .......................................... 455/445

(58) Field of Classification Search
USPC ........... 455/67.13, 420, 423, 550.1, 522, 513, 455/453, 445, 450, 452.1; 370/282, 328, 370/230

See application file for complete search history.

(56) References Cited

U.S. PATENT DOCUMENTS

| | | | |
|---|---|---|---|
| 7,508,778 B2 * | 3/2009 | Yafuso | 370/282 |
| 2004/0085922 A1 * | 5/2004 | Herle | 370/328 |
| 2007/0099576 A1 * | 5/2007 | Vukovic et al. | 455/67.13 |
| 2007/0111748 A1 * | 5/2007 | Risbood | 455/550.1 |

* cited by examiner

*Primary Examiner* — Kiet Doan
(74) *Attorney, Agent, or Firm* — Hartman & Citrin LLC

(57) ABSTRACT

Methods, systems, and computer-readable media provide for adapting a quality of service mechanism based on feedback. A condition that affects quality of service of a communications network is monitored. An adaptation of the quality of service mechanism is determined based on a change to the condition. The adaptation is implemented on the communications network to improve the quality of service.

3 Claims, 3 Drawing Sheets

METHODS, SYSTEMS, AND COMPUTER-READABLE MEDIA FOR ADAPTING A QUALITY OF SERVICE MECHANISM BASED ON FEEDBACK

TECHNICAL FIELD

This application relates generally to the field of cellular-related quality of service. More specifically, the disclosure provided herein relates to the field of adapting a QoS mechanism based on feedback.

BACKGROUND

Cellular-related quality of service ("QoS") issues are a significant source of frustration for service providers as well as their customers. Common QoS issues include bandwidth limitations, jitter, delay and latency, packet loss, and interference. QoS issues may result in a number of problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. QoS problems may result in unacceptable quality of service, causing customer dissatisfaction ranging from annoyance to anger. QoS problems may result in unacceptable quality of service, causing customer dissatisfaction ranging from annoyance to anger.

Many techniques are well-known for improving QoS in wireline networks. A number of these techniques rely on the static nature of wireline networks. That is, the wireline link conditions typically do not change during ordinary usage. In contrast, cellular networks often experience problems that are not experienced on wireline networks. In one example, unlike wireline networks, cellular networks may enable a user to move across different cells in the cellular network with few, if any, limitations. While the mobility is a benefit to the user, the service provider is left with the challenge of addressing dynamic QoS issues of the mobile user. In another example, even if the mobile user stays at one location, cellular networks often experience significant and rapid changes in the radio frequency ("RF") link conditions, which can effectively terminate communications (e.g., a dropped call) or cause other problems. As such, rigid QoS techniques that may be effective on wireline networks tend to be less effective on cellular networks, in part because the operation of rigid QoS mechanisms is generally not adaptive.

SUMMARY

Embodiments of the disclosure presented herein include methods, systems, and computer-readable media for adapting a quality of service mechanism based on feedback. According to one aspect, a method for adapting a quality of service mechanism based on feedback is provided. According to the method, a condition that affects quality of service of a communications network is monitored. An adaptation of the quality of service mechanism is determined based on a change to the condition. The adaptation is implemented on the communications network to improve the quality of service.

According to another aspect, a system for adapting a quality of service mechanism based on feedback is provided. The system includes a memory and a processor functionally coupled to the memory. The memory stores a program containing code for adapting the cellular resource. The processor is responsive to computer-executable instructions contained in the program and operative to monitor a condition that affects quality of service of a communications network, determine an adaptation of the quality of service mechanism based on a change to the condition, and implement the adaptation on the communications network to improve the quality of service.

According to yet another aspect, a computer-readable medium having instructions stored thereon for execution by a processor to perform a method for adapting a quality of service mechanism based on feedback is provided. According to the method, a condition that affects quality of service of a communications network is monitored. An adaptation of the quality of service mechanism is determined based on a change to the condition. The adaptation is implemented on the communications network to improve the quality of service.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
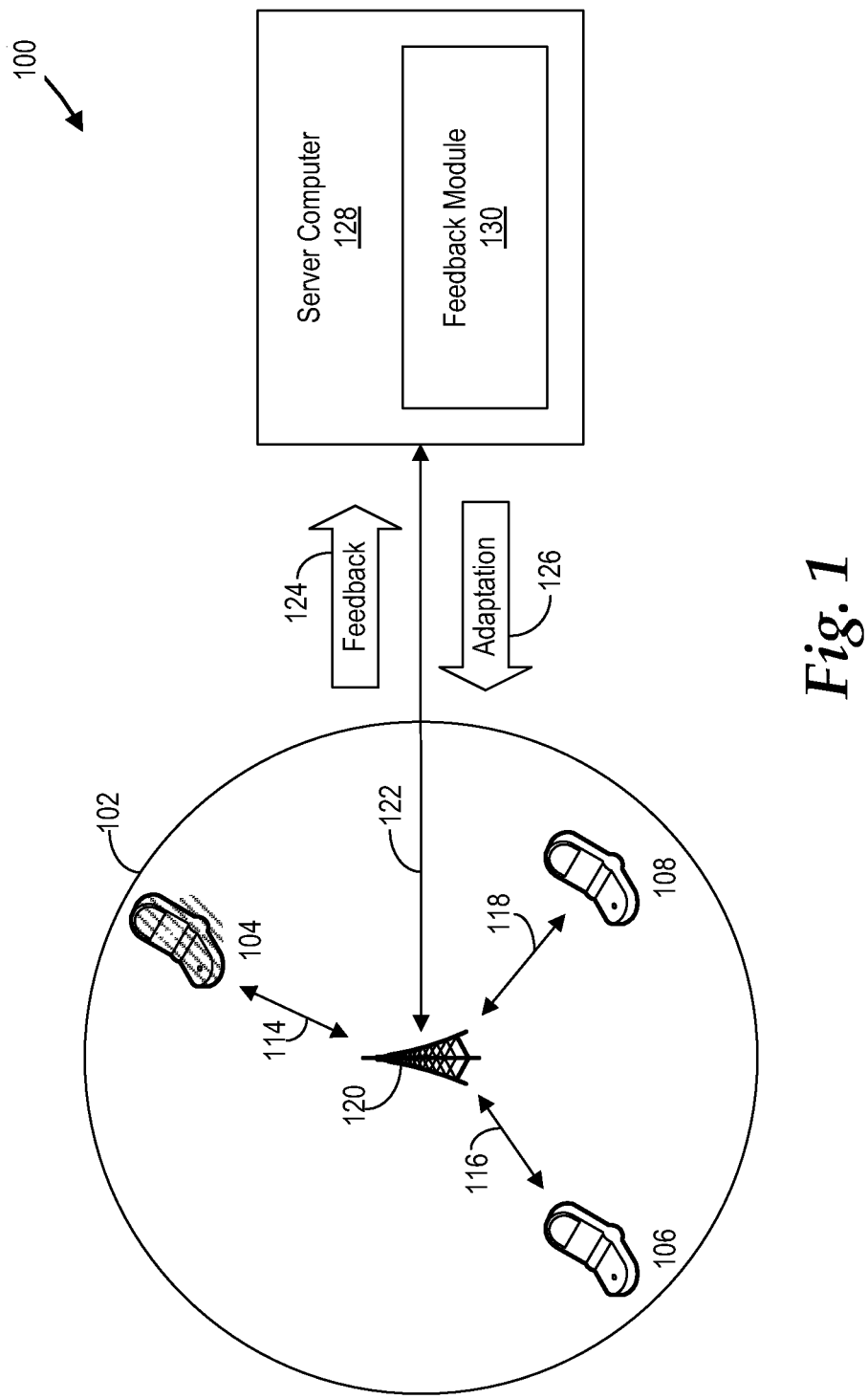
FIG. 1 is a high-level diagram illustrating an exemplary configuration of a cellular tower operatively coupled to a server computer via a backbone network.

The following detailed description is directed to methods, systems, and computer-readable media for adapting a quality of service ("QoS") mechanism based on feedback. In the following detailed description, references are made to the accompanying drawings that form a part hereof, and which are shown by way of illustration through specific embodiments or examples. As used herein, the term "QoS mechanism" refers to any suitable technique, approach, system, logic, process, scheme, and/or executable computer code that affects, controls, and/or influences the QoS or quality of experience ("QoE") related to a communication.

The QoS related to a cellular network is generally associated with a number of different factors. One factor that may affect QoS is the radio frequency ("RF") link condition between a cellular device and a cellular tower within an associated cell. Another factor that may affect QoS is the condition of the backbone network between the cellular tower and a central controller. Embodiments described herein provide for dynamic QoS adaptation based on real-time QoS feedback. Examples of QoS feedback include feedback related to the RF link condition, such as signal strength and interference levels, as well as feedback related to backbone network condition, such as jitter and delay. Although not so limited, embodiments described herein primarily refer to a cellular network solely for the sake of illustration. However, it should be appreciated that the embodiments described herein may also be applicable to any suitable wireless and wireline networks, as contemplated by those skilled in the art.

Generally, QoS mechanisms that control, affect, or provide a desired QoS may perform a number of actions including, but not limited to, reserving resources (e.g., Integrated Services ("IntServ"), Resource Reservation Protocol ("RSVP")), prioritizing and applying different treatments based on the prioritization (e.g., Differentiated Services ("DiffServ")), controlling resources, affecting connection admission (e.g., Connection Admission Control ("CAC"), Session Admission Control ("SAC")), and performing variants and combinations thereof. However, QoS mechanisms tend to have a particular range of effect based on their configuration. In many cases, this range of effect cannot handle large or fast changes in conditions that commonly occur in a wireless environment (e.g., a cellular environment) and may even occur in other environments, such as a wireline environment. By dynamically adapting the QoS mechanism based on real-time QoS feedback, frequent and/or rapid changes in the cellular network can be addressed by suitably adjusting the range of effect such that unnecessary action can be reduced and necessary action can be increased when needed.

The QoS adaptation generally refers to any suitable action in which a QoS mechanism is adjusted or modified. This may involve a priority scheme and/or a resource control scheme in which a first group of cellular devices is provided increased QoS at the expense of a second group of cellular devices. For example, the first group of cellular devices may experience an increase in QoS due to increased priority and associated treatment and/or a greater amount of cellular resources available, while the second group of cellular devices may experience a decrease in QoS due to decreased priority and associated treatment and/or a lesser amount of cellular resources available. In one example, the QoS adaptation may include increasing the level of a cellular resource reallocated from the second group of cellular devices to the first group of cellular devices, thereby providing an increased effect in response to a severe and/or a fast deterioration in wireless conditions which would otherwise result in an unsatisfactory decline in effective data throughput. In another example, the QoS adaptation may include increasing a tendency or degree by which one or more cellular devices in the second group are dropped in order to free an amount of a cellular resource. The freed amount of the cellular resource may then be reallocated to cellular devices in the first group. As used herein, the term "drop" refers to terminating a connection in whole or in part. For example, the connection may be terminated in part if one component session or logical connection is dropped within an overall physical connection or radio frequency ("RF") link.

Non-limiting examples of adaptations that can be performed with respect to resource reservation schemes, such as IntServ, include adjusting or modifying the amount of resources (e.g., bandwidth) reserved in response to a particular request or type of request. The resources may be adjusted or modified not only for the cellular devices associated with the request, but for other cellular devices as well. Non-limiting examples of adaptations that can be performed with respect to priority schemes, such as DiffServ, include adjusting or modifying the number of different classes of priority as well as the specific treatment and/or the type of treatment such as queue servicing provided with respect to each class. Non-limiting examples of adaptations that can be performed with respect to resource control schemes, such as cellular radio power and bandwidth control, include adjusting or modifying the amount of the cellular resource and/or the type of cellular resource, the time for which the decision remains in effect and/or is updated, and whether the resource control is applied to the cellular device associated with the request and/or to other cellular devices. Non-limiting examples of adaptations that can be performed with respect to admission schemes, such as CAC, include adjusting or modifying whether to admit and/or drop connections, sessions, and other communications associations, which communications associations to admit and/or drop, the number of communications associations to admit and/or drop, how quickly or with what delay to admit and/or drop the communications associations, whether and to what degree to allow a repeated admission or drop decision for a device and/or class of devices, and whether and for what time period to "lock" the admission and/or drop decision into place.

In one embodiment, each cellular device is associated with a particular class, which defines a level of QoS. For example, a plurality of cellular devices in a cell may be divided into a preferred class, which comprises those cellular devices entitled to a higher level of QoS, and a regular class, which comprises those cellular devices not entitled to the higher level of QoS. If conditions in the cell change such that the preferred class experiences degradation in the QoS which cannot be sufficiently handled by the existing action of the available QoS mechanism prior to adaptation, a larger than normal amount of one or more cellular resources allocated to the regular class may be taken from the regular class and given to the preferred class. In one example, the associated amount of cellular resource may be reallocated from one or more cellular devices in the regular class to one or more cellular devices in the preferred class. In another example, one or more additional cellular devices in the regular class may be dropped from the cell to free the given amount of the cellular resource, over and above the normal amount which would have been dropped prior to adaptation. The freed amount of the cellular resource may then be provided to the preferred class to compensate for the degradation in the QoS. In both examples, a decision is made to provide a high level of QoS to the preferred class even at the potential detriment to the QoS of the regular class, and adaptation has been used to influence the degree of action or the range of the effect. Such decisions are often made by businesses, for example, in accordance with a business and/or service policy, to benefit and retain the most desired customers of the businesses. These businesses may also desire to avoid unnecessary actions that have no beneficial effect, while ensuring adequate necessary actions in accordance with the business and/or service policy.

Referring now to the drawings, it is to be understood that like numerals represent like elements through the several figures, and that not all components and/or steps described and illustrated with reference to the figures are required for all embodiments. FIG. 1 is a high-level diagram 100 illustrating an exemplary configuration of a cellular tower 120 operatively coupled to a server computer 128 via a backbone network 122. The backbone network 122 may be a conventional wireline backbone network or other suitable network by which the server computer 128 can control the cellular tower 120. The range of the cellular tower 120 defines a cell 102. The cell 102 includes a first cellular device 104, a second cellular device 106, and a third cellular device 108. The first cellular device 104, as shown by the cross-hatching in FIG. 1, is associated with a preferred class that is entitled a higher QoS. The preferred class may be based on the first cellular device 104. For example, the first cellular device 104 may be a top-of-the-line model. The preferred class may also be based on a user associated with the first cellular device 104. For example, the user may subscribe to a premium data plan. The preferred class may further be based on a computer application executed by the first cellular device 104. For example, the computer application may stream video, thereby requiring higher QoS. The first cellular device 104 is referred to herein as a high QoS device. The second and third cellular devices 106, 108 are associated with a lower class that is not entitled to the higher QoS that the first cellular device 104 is entitled. The second and third cellular devices 106, 108 are referred to herein as low QoS devices. The cellular devices 104, 106, 108 may include, but are not limited to, cellular phones, smartphones, and personal digital assistants ("PDAs").

As shown in FIG. 1, the first cellular device 104 communicates with the cellular tower 120 via a first radio frequency ("RF") link 114. The second cellular device 106 and the third cellular device 108 communicate with the cellular tower 120 via a second RF link 116 and a third RF link 118, respectively. Unlike a wireline device, such as a conventional telephone, a user may utilize a cellular device, such as the cellular devices 104, 106, 108, while moving a significant distance. As the user moves, the RF links 114, 116, 118 may change accordingly, sometimes for the better (i.e., improving QoS) and sometimes for the worse (i.e., decreasing QoS). The change in the RF links 114, 116, 118 may be caused by any number of factors including, but not limited to, changes in the distance between the RF links 114, 116, 118 and the cellular tower 120, the appearance and disappearance of obstructions between the RF links 114, 116, 118 and the cellular tower 120, and environmental changes within the cell 102. The QoS provided to the cellular devices 104, 106, 108 may also be affected by the backbone network 122. For example, the backbone network 122 may experience delay and jitter.

To account and compensate for the changes in QoS caused by the movement of the cellular devices 104, 106, 108 as well as problems in the backbone network 122, a feedback module 130 in the server computer 128 may receive feedback 124 from the cellular tower 120 and transmit a QoS adaptation 126 to the cellular tower 120 based on the feedback 124. In particular, the feedback 124 may include information regarding conditions related to the RF links 114, 116, 118 as well as conditions related to the backbone network 122. Exemplary conditions related to the RF links 114, 116, 118 include, but are not limited to, signal levels, noise/interference levels, signal-to-noise ratios, and data loss levels. Exemplary conditions related to the backbone network 122 include, but are not limited to, jitter and delay. The QoS adaptation 126 may instruct the cellular tower 120 to reallocate a cellular resource, such as bandwidth, among the cellular devices 104, 106, 108. In one example, if the feedback 124 indicates that the QoS related the first cellular device 104 has degraded below an acceptable level, the feedback module 130 may reallocate a cellular resource from the second cellular device 106 and/or the third cellular device 108 to the first cellular device 104. In another example, the feedback module 130 may drop the second cellular device 106 and/or the third cellular device 108 to free an amount of the cellular resource, which can then be provided to the first cellular device 104 to compensate for the degradation in the QoS. In both examples, the first cellular device 104 is able to maintain an adequate level of QoS even at the potential detriment to the QoS of the second and third cellular devices 106, 108.

In one embodiment, the feedback module 130 monitors the conditions related to the RF links 114, 116, 118, as well as the conditions related to the backbone network 122, and collects the feedback 124. The level of QoS is generally proportional to the monitored conditions. That is, when the monitored conditions are satisfactory, then the level of QoS is generally satisfactory. Likewise, when the monitored conditions are unsatisfactory, then the level of QoS is generally unsatisfactory. After a given amount of the feedback 124 has been collected, the feedback module 130 compares the feedback 124 to one or more thresholds. Each threshold may establish a baseline level for each of the monitored conditions. If the monitored conditions fall below the thresholds, then a drop in QoS may be presumed, and corrective action can be taken in response. In one example, if the monitored conditions fall below the thresholds, the cellular resource may be reallocated from the second and/or third cellular devices 106, 108 to the first cellular device 104. In another example, the second cellular device 106 and/or the third cellular device 108 may be dropped by the cellular tower 120 to free an amount of the cellular resource, which can then be provided to the first cellular device 104 to compensate for the degradation in the monitored conditions.

Figure 2:
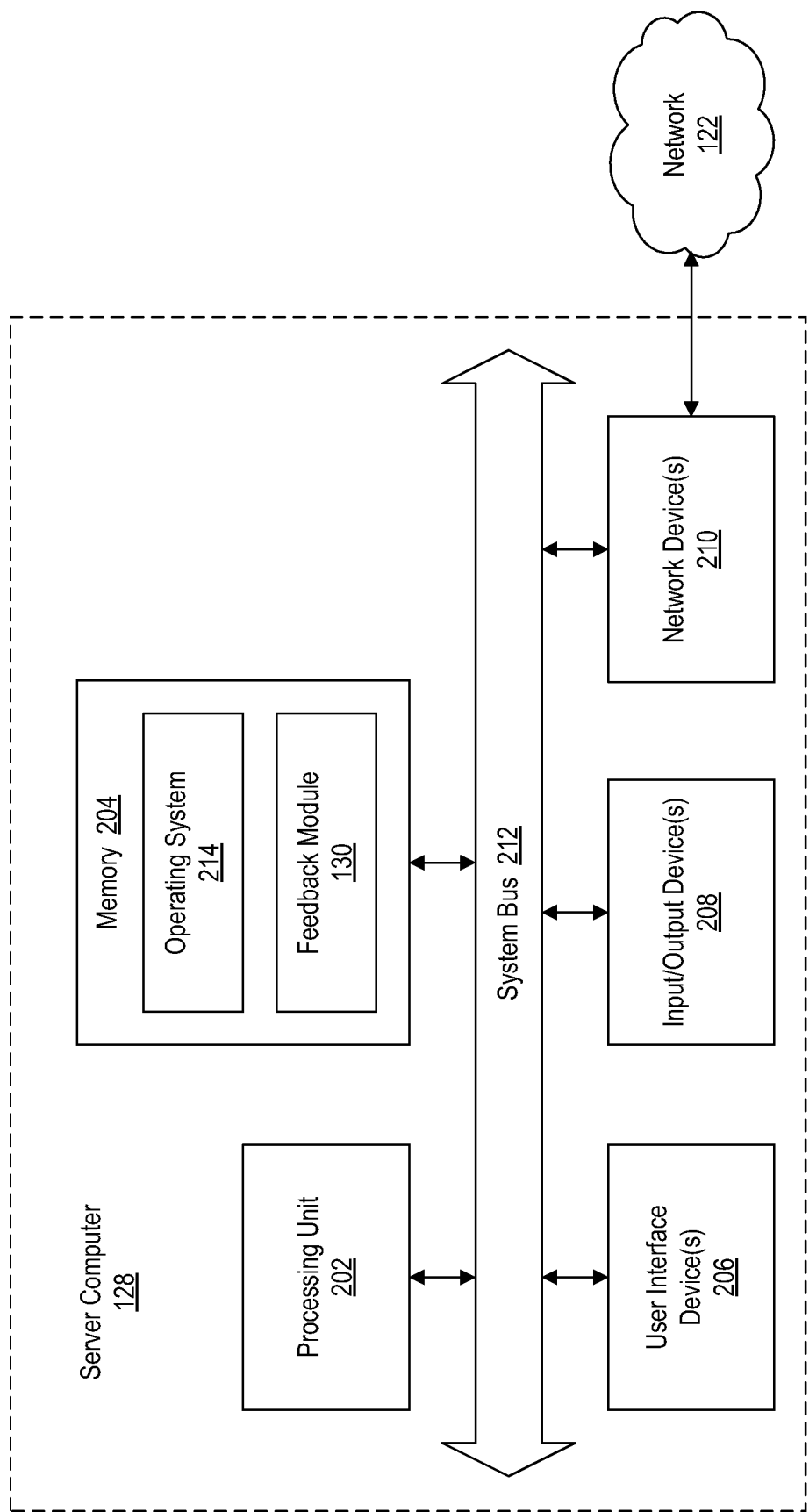
FIG. 2 is a block diagram illustrating the system configured to adapt a cellular resource based on feedback, in accordance with exemplary embodiments.

FIG. 2 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 2 is a block diagram illustrating the server computer 128 configured to adapt cellular resources based on feedback, in accordance with exemplary embodiments. The server computer 128 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. The memory 204 includes an operating system 214 and the feedback module 130, according to exemplary embodiments. Examples of operating systems, such as the operating system 214, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. In one embodiment, the feedback module 130 is embodied in computer-readable media containing instructions that, when executed by the processing unit 202, performs a method for adapting a QoS mechanism based on feedback, as described in greater detail below with respect to FIG. 3. According to further embodiments, the feedback module 130 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the server computer 128.

The user interface devices 206 may include one or more devices with which a user accesses the server computer 128. The user interface devices 206 may include, but are not limited to, computers, servers, personal digital assistants, cellular phones, or any suitable computing devices. The I/O devices 208 enable a user to interface with the feedback module 130. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, or an electronic stylus. Further, the I/O devices 208 may include one or more output devices, such as, but not limited to, a display screen or a printer.

The network devices 210 enable the server computer 128 to communicate with other networks or remote systems via a network, such as the backbone network 122. Examples of the network devices 210 may include, but are not limited to, a modem, a radio frequency ("RF") or infrared ("IR") transceiver, a telephonic interface, a bridge, a router, or a network card. The backbone network 122 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the backbone network 122 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 3:
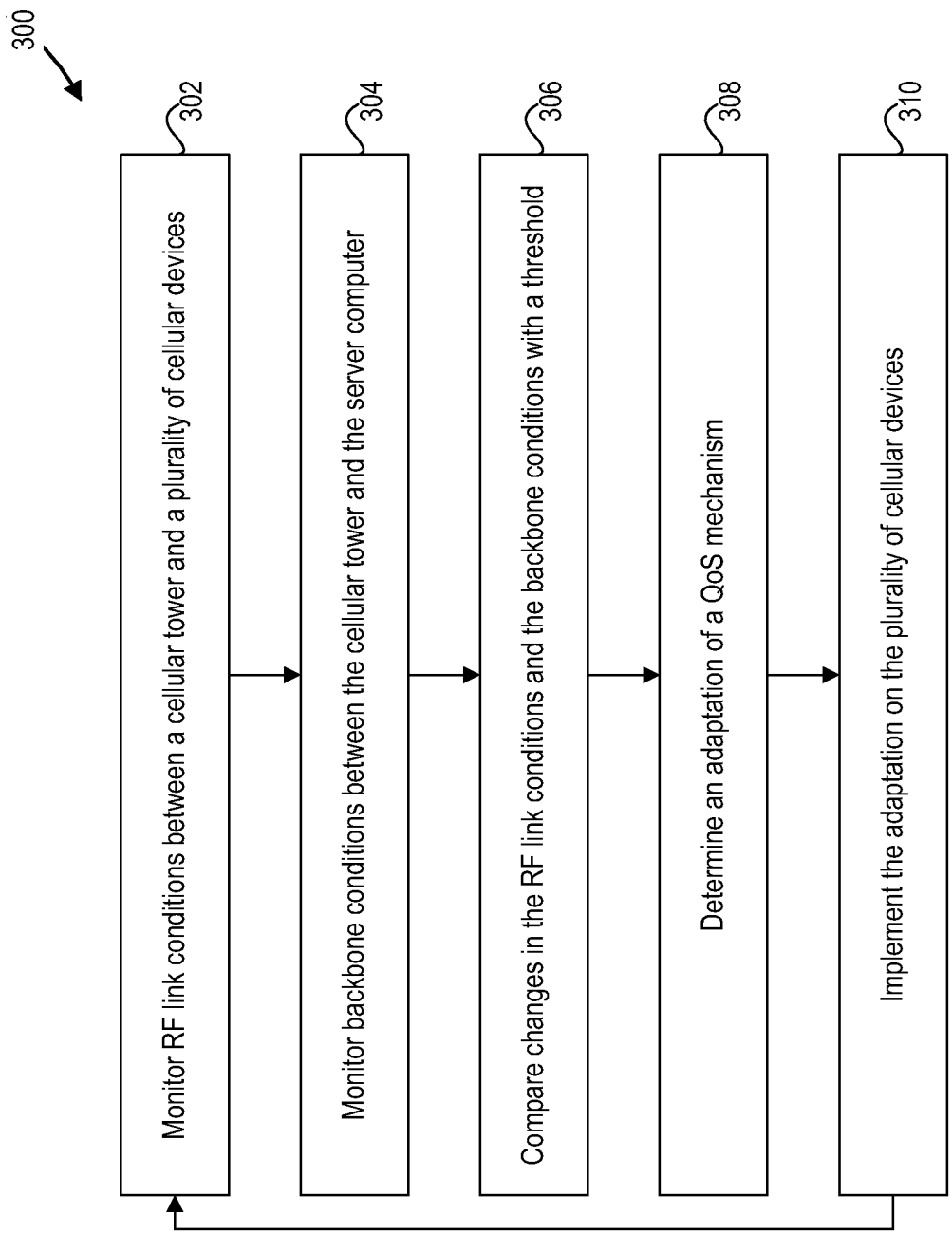
FIG. 3 is a flow diagram illustrating a method for adapting a quality of service mechanism based on feedback, in accordance with exemplary embodiments.

FIG. 3 is a flow diagram illustrating a method 300 for adapting a QoS mechanism based on feedback, in accordance with exemplary embodiments. According to the method 300, the feedback module 130 monitors (at 302) conditions related to the RF links 114, 116, 118 between the cellular tower 120 and each of the cellular devices 104, 106, 108. Exemplary conditions related to the RF links 114, 116, 118 include, but are not limited to, signal levels, noise/interference levels, signal-to-noise ratios, and data loss levels. The feedback module 130 further monitors (a 304) conditions related to the backbone network 122. Examples of conditions related to the backbone network 122 include, but are not limited to, jitter and delay. As used herein, the feedback 124 includes the conditions related to the RF links 114, 116, 118 as well as the conditions related to the backbone network 122. The feedback module 130 may perform the monitoring utilizing specialized instrumentation and/or utilizing monitoring and reporting features offered by various network elements, such as routers, switches, firewalls, gateways, aggregators, cellular devices, and the like.

Once a given amount of the feedback 124 is received, the feedback module 130 compares (at 306) the feedback 124 with one or more thresholds, which may be stored in the memory 204. The thresholds may establish a baseline level for the conditions related to the RF links 114, 116, 118 and the conditions related to the backbone network 122. For example, the baseline level may be a minimum level of satisfaction. In this case, if the feedback 124 is higher than the thresholds, the QoS may be deemed higher than minimally satisfactory, and if the feedback 124 is lower than the thresholds, the QoS may be deemed below satisfactory. In one embodiment, the thresholds may be altered as needed by accessing the server computer 128. As described in greater detail below, whether the feedback 124 is above or below the threshold may determine the adaptation 126 transmitted to the cellular tower 120.

In a first embodiment, the conditions related to each of the RF links 114, 116, 118 may be compared with the threshold. As previously mentioned, the conditions related to the RF links 114, 116, 118 may include signal levels, noise/interference levels, signal-to-noise ratios, and data loss levels. In a second embodiment, the aggregate conditions related two or more of the RF links 114, 116, 118 may be compared with the threshold. While individual conditions related to each of the RF links 114, 116, 118 may be small and go unnoticed, the aggregate change may be significant. In a third embodiment, the conditions related to the backbone network 122 may be compared with the threshold. For example, an amount of jitter and delay in the backbone network 122 may be compared with the threshold to determine whether the amount of jitter or delay is tolerable or adversely affects QoS.

The feedback module 130 determines (at 308) the QoS adaptation 126 of a QoS mechanism based on whether the feedback 124 exceeds or falls below the thresholds, and implements (at 310) the QoS adaptation 126 on the cellular devices 104, 106, 108. The QoS adaptation 126 may also be implemented on network elements, such as routers, switches, gateways, firewalls, border controllers, aggregators, controllers, base stations, and the like, as well as any other suitable components in the cellular network that affect the QoS mechanism. In one embodiment, the QoS adaptation 126 is configured to favor the high QoS user, such as the first cellular device 104, even at the detriment of the low QoS user, such as the second and third cellular devices 106, 108. In one example, if the feedback 124 falls below the thresholds, the feedback module 130 may instruct the cellular tower 120 to reallocate a cellular resource from the second cellular device 106 and/or the third cellular device 108 to the first cellular device 104. In another example, the feedback module 130 may drop the second cellular device 106 and/or the third cellular device 108 to free an amount of the cellular resource, which can then be provided to the first cellular device 104 to compensate for the degradation in the monitored conditions. Exemplary adaptations include, but are not limited to, IntServ, DiffServ, and connection admission control ("CAC").

In one embodiment, operations 302, 304, 306, 308, 310 may be repeated for a given number of times or until a satisfactory QoS is achieved. It should be appreciated that the magnitude of the adaptation 126 may be proportional to the magnitude of the change in the monitored conditions. For example, the adaptation 126 may be more substantial to compensate for a greater change in the QoS resulting from a greater difference between the feedback 124 and the thresholds. Likewise, the adaptation 126 may be in smaller increments if the difference between the feedback 124 and the thresholds is correspondingly small. In a further embodiment, a variable delay (not shown) may be added during the loop back from operation 302 to operation 310. The variable delay may be utilized to provide the feedback module 130 a sufficient amount of time in which to implement the adaptation 126.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for adapting a quality of service mechanism based on feedback, comprising:
    monitoring a condition that affects quality of service of a cellular network, the condition comprising a radio frequency link condition of a first radio frequency link between a cellular tower and a first cellular device in the cellular network;
    identifying a change to the radio frequency link condition that decreases a first quality of service associated with the first cellular device;
    determining whether the change to the radio frequency link condition falls below a threshold; and
    in response to determining that the change to the radio frequency link condition falls below the threshold, terminating a second radio frequency link between the cellular tower and a second cellular device in the cellular network to free a cellular resource and allocating the cellular resource to the first cellular device, wherein terminating the second radio frequency link decreases a second quality of service associated with the second cellular device and reallocating the cellular resource from the second cellular device to the first cellular device increases the first quality of service associated with the first cellular device;
    wherein monitoring a condition that affects quality of service of a cellular network comprises monitoring signal level between the cellular tower and the first cellular device, a noise level between the cellular tower and the first cellular device, and a data loss level between the cellular tower and the first cellular device.

2. A system for adapting a quality of service mechanism based on feedback, comprising:
    a memory for storing a program containing code for adapting a quality of service mechanism based on feedback;
    a processor functionally coupled to the memory, the processor being responsive to computer-executable instructions contained in the program and operative at least to:
    monitor a condition that affects quality of service of a cellular network, the condition comprising a radio frequency link condition of a first radio frequency link between a cellular tower and a first cellular device in the cellular network,
    identify a change to the radio frequency link condition that decreases a first quality of service associated with the first cellular device,
    determine whether the change to the radio frequency link condition falls below a threshold, and
    in response to determining that the change to the radio frequency link condition falls below the threshold, terminate a second radio frequency link between the cellular tower and a second cellular device in the cellular network to free a cellular resource and allocate the cellular resource to the first cellular device, wherein termination of the second radio frequency link decreases a second quality of service associated with the second cellular device and reallocation of the cellular resource from the second cellular device to the first cellular device increases the first quality of service associated with the first cellular device;
    wherein to monitor a condition that affects quality of service of a cellular network, the processor is further operative at least to monitor a signal level between the cellular tower and the first cellular device, a noise level between the cellular tower and the first cellular device, and a data loss level between the cellular tower and the first cellular device.

3. A non-transitory computer-readable medium having instructions stored thereon for execution by a processor to provide a method for adapting a quality of service mechanism based on feedback, the method comprising:
    monitoring a condition that affects quality of service of a cellular network, the condition comprising a radio frequency link condition of a first radio frequency link between a cellular tower and a first cellular device in the cellular network;
    identifying a change to the radio frequency link condition that decreases a first quality of service associated with the first cellular device;
    determining whether the change to the radio frequency link condition falls below a threshold; and
    in response to determining that the change to the radio frequency link condition falls below the threshold, terminating a second radio frequency link between the cellular tower and a second cellular device in the cellular network to free a cellular resource and allocating the cellular resource to the first cellular device, wherein terminating the second radio frequency link decreases a second quality of service associated with the second cellular device and reallocating the cellular resource from the second cellular device to the first cellular device increases the first quality of service associated with the first cellular device;
    wherein monitoring a condition that affects quality of service of a cellular network comprises monitoring signal level between the cellular tower and the first cellular device, a noise level between the cellular tower and the first cellular device, and a data loss level between the cellular tower and the first cellular device.

* * * * *